United States Patent [19]

Adachi

[11] Patent Number: 5,606,246
[45] Date of Patent: Feb. 25, 1997

[54] POWER SUPPLY UNIT FOR VEHICLES

[75] Inventor: Katsumi Adachi, Himeji, Japan

[73] Assignee: Mitsubishi Denki Kabushiki Kaisha, Tokyo, Japan

[21] Appl. No.: 532,496

[22] Filed: Sep. 22, 1995

[30] Foreign Application Priority Data

Sep. 26, 1994 [JP] Japan ................................ 6-229856

[51] Int. Cl.⁶ ............................................ H02P 9/00
[52] U.S. Cl. ................................. 322/8; 322/22; 322/25
[58] Field of Search ............................ 322/7, 8, 22, 25, 322/28; 307/10.6

[56] References Cited

U.S. PATENT DOCUMENTS

| | | | |
|---|---|---|---|
| 4,084,126 | 4/1978 | Clements | 322/8 |
| 4,330,715 | 5/1982 | Stroud et al. | |
| 4,985,670 | 1/1991 | Kaneyuki et al. | 322/28 |
| 5,072,098 | 12/1991 | Matthews et al. | 219/501 |
| 5,166,538 | 11/1992 | Norton | 307/10.1 |
| 5,210,480 | 5/1993 | Iwatani et al. | 322/28 |
| 5,483,146 | 1/1996 | Schultz et al. | 322/7 |

FOREIGN PATENT DOCUMENTS 0371472  6/1990  European Pat. Off. .
63-302735  9/1988  Japan .

Primary Examiner—Steven L. Stephan
Assistant Examiner—Nicholas Ponomarenko
Attorney, Agent, or Firm—Sughrue, Mion, Zinn, Macpeak & Seas

[57] ABSTRACT

A highly reliable and low cost power supply unit for vehicles is provided which allows the control operation of a high voltage load controller to be carried out easily. When electric power is supplied from a generator 1A to a high voltage load 5, a change-over relay 4A is switched so that a battery 6a is connected to the high voltage load 5 to excite a field winding 12 of the generator. A first diode 21 and a second diode 22 are provided so that when the electric power generated by the generator the current generated by the generator is prevented from flowing into a vehicle system voltage load 6 including a battery 6a.

8 Claims, 6 Drawing Sheets

POWER SUPPLY UNIT FOR VEHICLES

BACKGROUND OF THE INVENTION

1. Field of the Invention

The invention relates to a power supply unit for vehicles, and, in particular, to a power supply unit for vehicles which can easily control electric power supply to a high voltage load.

2. Description of the Related Art

FIG. 6 illustrates a circuit configuration of a conventional power supply unit for vehicles as disclosed in U.S. Pat. No. 4,084,126. In the figure, a generator (ALT) 1 is formed by stator windings 11, field winding 12 to which is supplied a field current, controlled by a field current control circuit 2, from an output terminal A of the generator 1, and rectification circuit 13 which rectifies the AC voltage developed in the stator windings 11 to DC voltage. A change-over relay 4 which contains a movable contact 4a is connected to the output terminal A of the generator 1 to perform switching so as to allow the current to be output from the generator 1 based on the output of a high voltage load controller 3. A terminal H which is connected to one contact 4b of the change-over relay 4 is connected to a high voltage load 5, while a terminal B which is connected to the other fixed contact 4c is connected to a vehicle system voltage load 6 which includes the usual battery 6a. A self-excitation circuit is formed with the voltage of the output terminal A of the generator 1 reaching a value required for supplying field current to the field winding 12.

Next, the operation will be described. After an ignition switch 7 has been turned on, turning on a starter switch (not shown) causes the high voltage load controller 3 to change the mode of the field current control circuit 2 from the no charge (field PTr OFF) mode to the system voltage generation mode at the time the engine (not shown) starts rotating. During the initial stage of voltage generation, the field winding 12 is connected to the fixed contact 4c (terminal B) which serves as the normally contacted contact of the change-over relay 4 as shown in the figure. After field current has been supplied to the field winding by the battery 6a, the generator starts to produce electric power.

In cases where electric power needs to be supplied to the high voltage load 5, when the voltage of the output terminal A of the generator 1 reaches a value which is capable of causing self-excitation, the change-over relay 4 is switched by the high voltage load controller 3 to connect the output terminal A to the terminal H on the high voltage load 5 side. The high voltage load controller 3 further outputs a total self-excitation or high voltage generation mode command to the field current control circuit 2 to put the circuit in the high voltage generation mode. In this way, high voltage electric power is supplied from the generator 1 to the high voltage load 5.

In cases where electric power no longer needs to be supplied to the high voltage load 5, to prevent such problems as reduced life of the change-over relay 4 contacts, dielectric breakdown caused by a surge voltage resulting from load blockage of the generator 1, and deteriorated semiconductor devices high voltage load controller 3 changes the field current control circuit 2 to the no charge mode. Then, after the output current to the high voltage load 5 has been reduced to a certain value or to zero, the controller switches the change-over relay 4 so that it is connected to the terminal B side. This connects the output terminal A of the generator 1 to the vehicle system voltage load 6 side which includes the usual battery 6a. Thereafter, the high voltage load controller 3 puts the field current control circuit 2 into the initial vehicle system voltage generation mode after a time lag of about 1 second. The high voltage load 5 is provided with a fail safe function and a temperature sensor 8 for detecting when power does not need to be supplied. The temperature sensor 8 is connected to a terminal T of the high voltage load controller 3. A noise-eliminating capacitor 9 is provided in the generator 1. A charge lamp 23 is provided between the field current control circuit 2 and the battery a to indicate to the user the various failure modes.

As described above, in the conventional power supply unit for vehicles, electric power is supplied to the high voltage load 5 in the following way. Through the change-over relay 4, electric power is supplied to the field winding 12 of the generator by the battery to cause excitation of the winding. This causes the generator 1 to be initially excited to operate, which puts it in a state allowing electric power generation by self excitation. Then, before a large amount of current produced by the generated voltage is introduced into the vehicle system voltage load 6 which includes the battery 6a, the change-over relay is switched at the proper time so that it is connected to the high voltage load 5 side. However, a complicated timing control is required since the conventional unit is constructed to prevent reduced life of the change-over relay 4 contacts caused by switching of the change-over relay when a large amount of current flows and dielectric breakdown caused by a high voltage surge resulting from the cutting off of a load.

SUMMARY OF THE INVENTION

Accordingly, it is an object of the invention to overcome the above problem by providing a power supply unit for vehicles which can easily supply electric power to a high voltage load, by switching a change-over relay so that it is connected to a high voltage load side from the start of the control operation when electric power is supplied to the high voltage load. Therefore, it is not necessary to control the timing for switching the change-over relay, nor to perform a sophisticated control operation including sensing of the output voltage of the generator to control the switching timing.

According to one aspect of the invention, there is provided a power supply unit for vehicles comprising a generator having stator windings and a field winding through which field current flows, a field current control circuit for controlling the field current, a change-over relay for switching the connection state of said generator between a first condition in which a high voltage load is connected to said generator and a second condition in which a vehicle system voltage load including a battery is connected to said generator, a high voltage load controller for controlling said change-over relay and said field current control circuit, a first diode having an anode connected between an output side of said generator and said change-over relay and a cathode connected to an input side of said field winding, and a second diode connected between said battery and the input side of said field winding to which the cathode of said first diode is connected, said second diode being directed forward from the battery side to the input side of said field winding.

In a preferred form of the invention, the first and second diodes are formed into an integral structure with the change-over relay.

In another preferred form of the invention, the first and second diodes are formed into an integral structure with the generator.

In another preferred form of the invention, the first and second diodes are provided in the field current control circuit, and common use is made of the anode side connection terminal of the second diode and a battery sensing terminal of the field current control circuit.

In a further preferred form of the invention, the field current control circuit is formed into an integral structure with the generator.

In yet another preferred form of the invention, the field current control circuit and the high voltage load controller are combined, along with an engine controller for controlling the engine, and formed into one or two units.

According to another aspect of the invention, there is provided a power supply unit for vehicles comprising a generator having stator windings and a field winding through which field current flows, said generator having its output side connected to an input side of said field winding, a field current control circuit for controlling the field current, a change-over relay for switching the connection state of said generator between a first condition in which a high voltage load is connected to said generator and a second condition in which a vehicle system voltage load including a battery, is connected to said generator, a high voltage load controller for controlling said change-over relay and said field current control circuit, and a series circuit including a diode and a resistor connected in series to each other between an output side of said generator and said battery with an anode of said diode being connected to said battery.

In a preferred form of the invention, the series circuit is formed into an integral structure with the change-over relay.

Accordingly, in the power supply unit for vehicles of the invention, when electric power needs to be supplied to a high voltage load, connecting the change-over relay to the high voltage load side causes field current from the battery, at the initial state of electric power generation, to be supplied to the field winding through the second diode. After electric power generation, field current is supplied to the field winding through the first diode from the generator. While power is supplied to the high voltage load through the change-over relay, a large amount of current resulting from high voltage developed by the generator is prevented by the second diode from flowing to the vehicle system voltage load side including the battery.

In addition, in the power supply unit for vehicles of the invention, diodes can be used to prevent a large amount of current resulting from a high voltage developed by the generator from flowing into the vehicle system voltage load including the battery. Further, when the change-over relay has been switched so that it is connected to the high voltage load side, the diodes can prevent a large amount of current from flowing to from the battery to the high voltage load.

DESCRIPTION OF THE PREFERRED EMBODIMENTS

The preferred embodiments of the present invention will be described below with reference to the accompanying drawings.

First Embodiment

Figure 1:
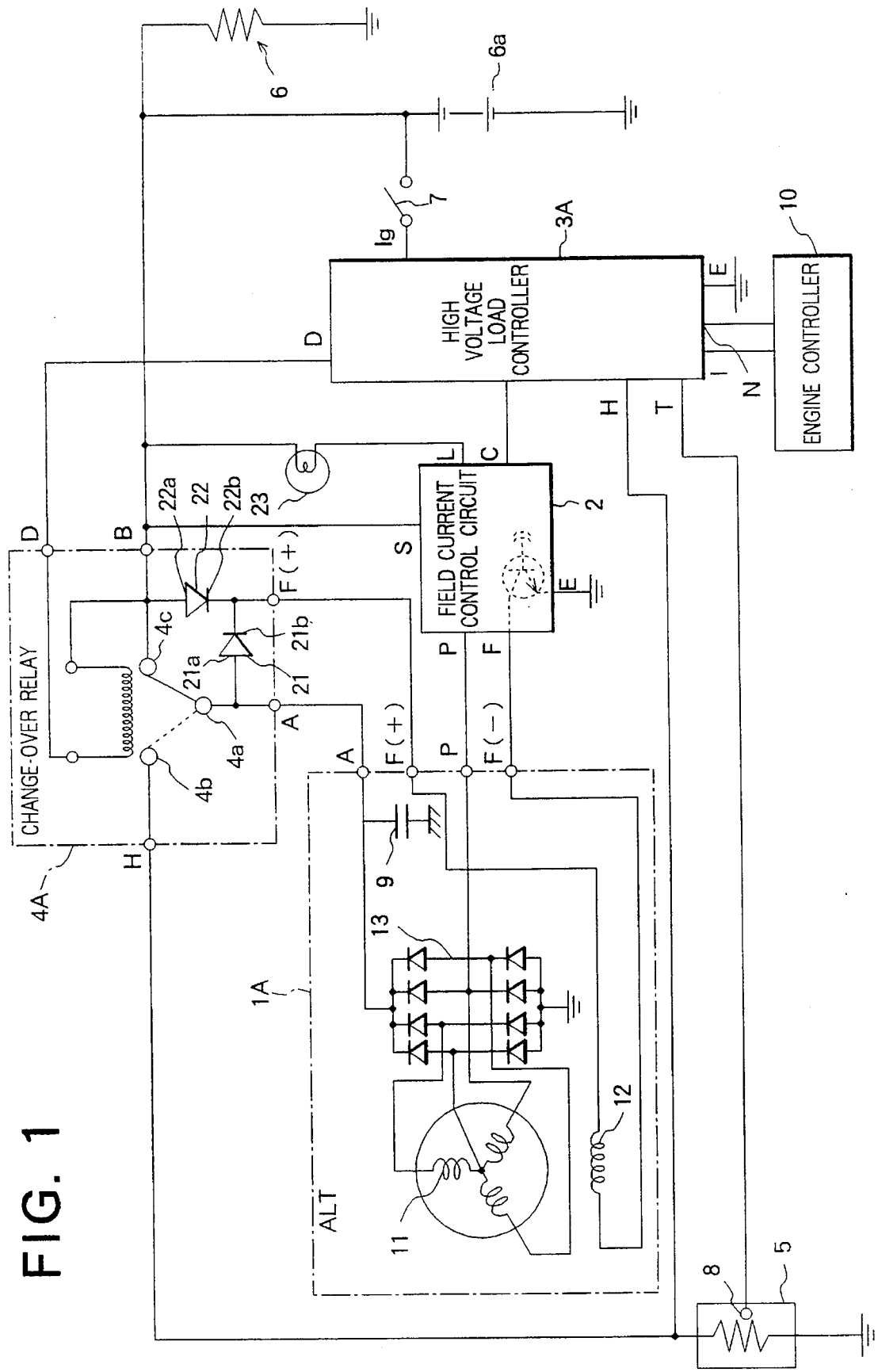
FIG. 1 is a circuit configuration illustrating a first embodiment of the present invention.
Figure 6:
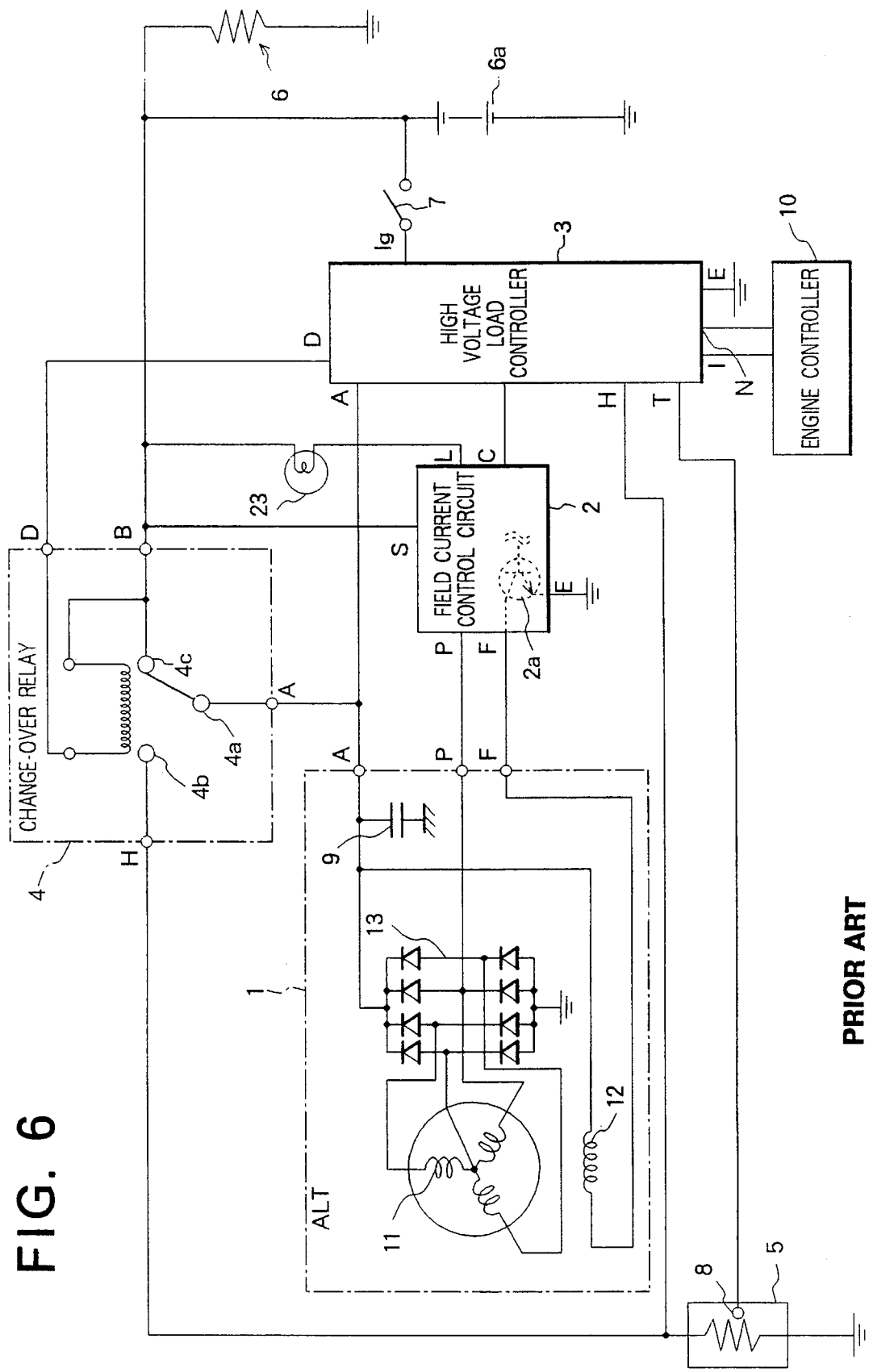
FIG. 6 is a circuit configuration illustrating a conventional power supply unit for vehicles.

FIG. 1 shows a configuration of a circuit of the first embodiment, in which parts similar to those in FIG. 6 are given the same reference numerals. In a change-over relay 4A, there are integrally incorporated a first diode 21 whose anode 21a is connected to a moving contact 4a which is located between the output side of a generating unit 1A and the change-over relay 4A and whose cathode 21b is connected to field current inflow terminal F(+) at the input side of a field winding 12, and a second diode 22 which is connected between the field current inflow terminal F(+) and the battery 6a forward from the battery 6a side to the field current inflow terminal F(+) side.

Field current outflow terminal F(−) which is the output side of the field winding 12 is connected to the F terminal of the field current control circuit 2 to which is sent a generation mode command from a high voltage load controller 3A, with the field winding 12 and the field current control circuit 2 forming an excitation circuit. The field current control circuit 2 not only excites the field winding 12 to the generation mode which has been generated, but also drives a charge lamp 23 connected between the L terminal and battery 6a. While the field current control circuit 2 senses the voltage at the battery 6a side with its S terminal connected to the battery 6a, it senses phase voltage of the stator windings 11, with its P terminal connected to stator windings 11 of the generator 1A.

The high voltage load controller 3A also detects the on/off state of an ignition switch 7, with the controller terminal Ig connected to the ignition switch 7, in addition to sending out a generation mode command to the field current control circuit 2. A terminal H is connected to the high voltage load 5 to monitor the applied voltage of the high voltage load 5. A terminal T is connected to a temperature sensor 8 provided in the high voltage load 5 to sense the temperature of the high voltage load 5. Further, terminals I and N are both connected to an engine controller 10 to send a revolution condition command to an engine (not shown) and to sense the revolution condition of the engine.

Next, the operation will be described. After the ignition switch 7 has been turned on, turning on a starter switch (not shown) causes the engine to start rotating. At the time the engine starts rotating, the high voltage load controller 3A switches the change-over relay 4A so that it is connected to the terminal H of the high voltage load side indicated by dashed lines in the figure. This causes an output terminal A (through moving contact 4a) of the generator to be connected to the high voltage load 5 side.

Thereafter, the high voltage load controller 3A sends a total excitation or high voltage generation mode command to the field current control circuit 2 to change the mode from the no charge (field PTr OFF) mode to the high voltage generation mode. The field current required for initial excitation of the generator 1A passes through the diode 22 connected to the battery 6a side, the field current inflow terminal (F+), the field winding 12, and through the field current outflow terminal (F−) and then is lead to the field current control circuit 2. This causes the generator 1A to generate electric power in the high voltage generation mode.

In the high voltage generation mode, as described above, the field current for initial excitation is supplied from the battery 6a through the diode 22, which causes the generator 1A to start generating electric power. When the output voltage of the generator 1A exceeds the voltage of the battery 6a, the field current passes from the output terminal A of the generator 1A, through the diode 21, to be supplied to the field winding 12, so that the generator switches to self-excitation mode. When this happens, the current is prevented from passing from the generator 1A to the battery 6a side by the diode 22.

Next, when it is no longer necessary to supply electric power to the high voltage load 5, the high voltage load controller 3A outputs a no charge mode command to the field current control circuit 2 so that there is less or no field current flowing through it is reduced or stepped completely. This causes reduced or no current to be output to the high voltage load 5. Thereafter, the high voltage load controller 3A switches the change-over relay 4A so that it is connected to the vehicle system voltage load 6 side containing the batteries 6a, which prevents reduced contact life of the change-over relay 4A, occurrence of destroyed coils and dielectric breakdown of capacitors caused by a surge of voltage resulting from the high blocking capability of the generator 1A, and deteriorated semiconductors. Then, the high voltage load controller 3A gives out a command to the field current control circuit 2 to change its mode from the no charge mode to the vehicle system voltage generation mode.

After the vehicle system voltage generation command has been output to the field current control circuit 2, the field current flows from the battery 6a through the diode 22 to the field winding 12, which causes the field winding 12 to be initially excited. When the output voltage of the generator 1A exceeds the voltage of the battery 6a, electric power is supplied from the output terminal A of the generator 1A to the vehicle system voltage load 6 containing the battery 6a. At the same time, the field current flows from the output terminal A through the diode 21, and/or through the change-over relay 24 and the diode 22, to the field winding 12, which causes the generator 1A to be in a self-excitation state.

As described above, in the first embodiment the first and second diodes 21 and 22 are incorporated in the change-over relay 4 in an integral structure therewith, which allows the diodes and the change-over relays to be integrally operated, thereby simplifying the switching operation.

Second Embodiment

Figure 2:
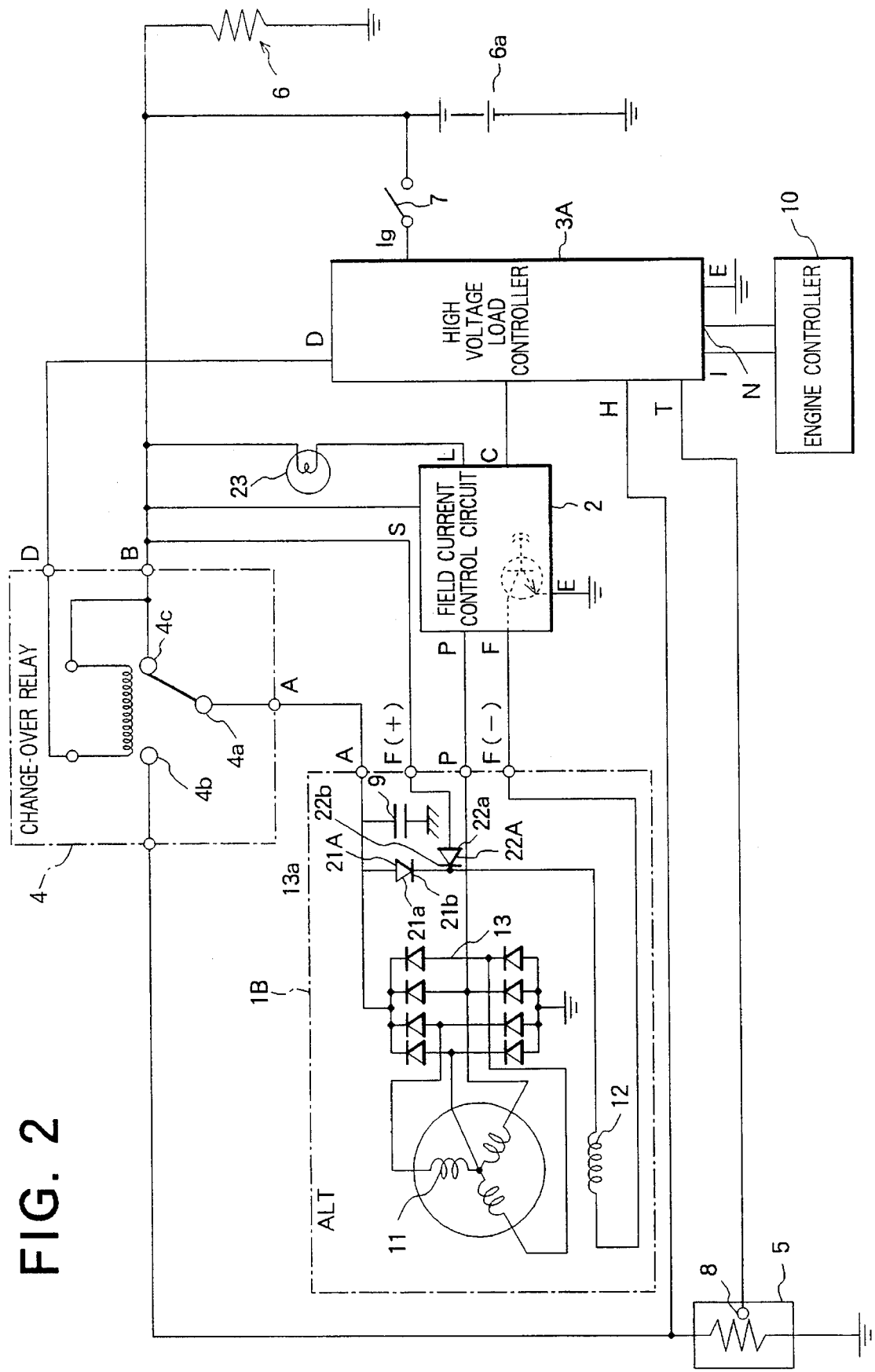
FIG. 2 is a circuit configuration illustrating a second embodiment of the present invention.

A second embodiment of the invention will be described below with reference to a drawing. FIG. 2 illustrates a configuration of a circuit of the second embodiment, in which similar parts to those in FIG. 1 are given the same reference numerals.

While in the first embodiment the first and second diodes are incorporated in the change-over relay in an integral structure therewith, in the second embodiment these diodes are incorporated in the generator in an integral structure therewith.

More specifically, as shown in FIG. 2, there are integrally incorporated in a generator 1B a first diode 21A whose anode 21a is connected to output terminal A of the generator 1B and whose cathode 21b is connected to the input side of field winding 12, and a second diode which is connected between the cathode 21b of the first diode 21A and the battery 6a forward from the battery 6a side to the field winding 12 side (the cathode 21b side of the first diode 21A).

Accordingly, integrally incorporating the first and second diodes 21A and 22A in the generator 1B allows existing change-over relays to be used and cooling of the first diode 21A and the second diode 22A to be carried out along with the generator 1B (for example by air-cooling fans). This results in smaller diodes having a longer life.

Third Embodiment

Figure 3:
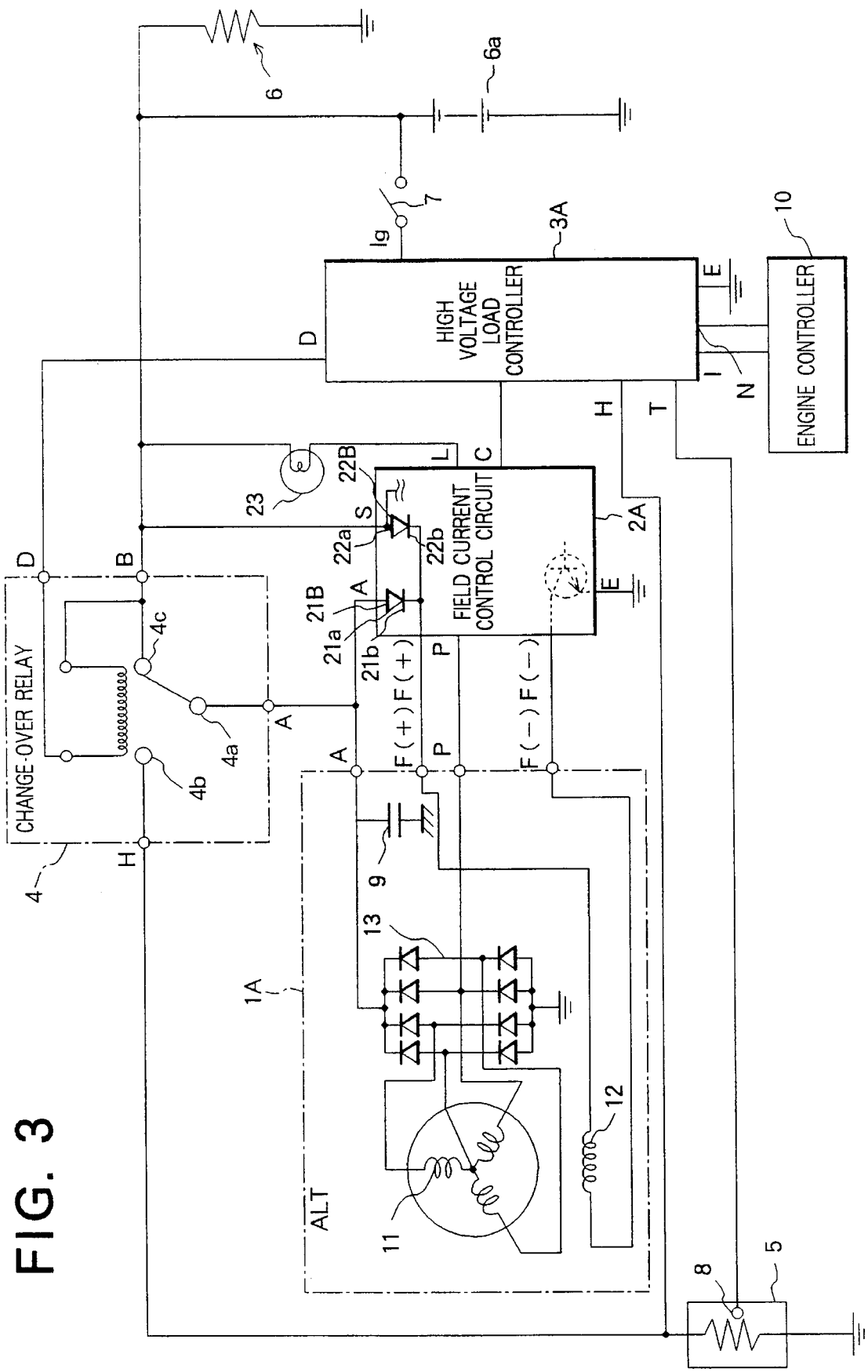
FIG. 3 is a circuit configuration illustrating a third embodiment of the present invention.

A third embodiment of the invention will be described with reference to a drawing. FIG. 3 illustrates a configuration of a circuit of the third embodiment, in which parts similar to those in FIG. 1 are given the same reference numerals.

In the third embodiment, a first and second diode are provided in a field current control circuit, and common use is made of the anode side connecting terminal of the second anode and a battery sensing terminal S of the field current control circuit.

More specifically, as shown in FIG. 3, there are integrally incorporated in field current control circuit 2A a first diode 21B whose anode 21a is connected to output terminal A of a generator 1A and whose cathode 21b is connected to field current inflow terminal F(+) of a field winding 12, and a second diode 22B disposed between the cathode 21b of the first diode 21B and the battery 6a forward from the battery 6a side to the field winding 12 side (the cathode 21b side of the first diode 21B).

According to the third embodiment, as in the second embodiment, existing change-over relays can be used, and incorporation of the first and second diodes 21B and 22B and connections can be carried out easily. In addition, common use can be made of the battery sensing S terminal and connection for the battery side diode which is the second diode 22B.

Fourth Embodiment

Figure 4:
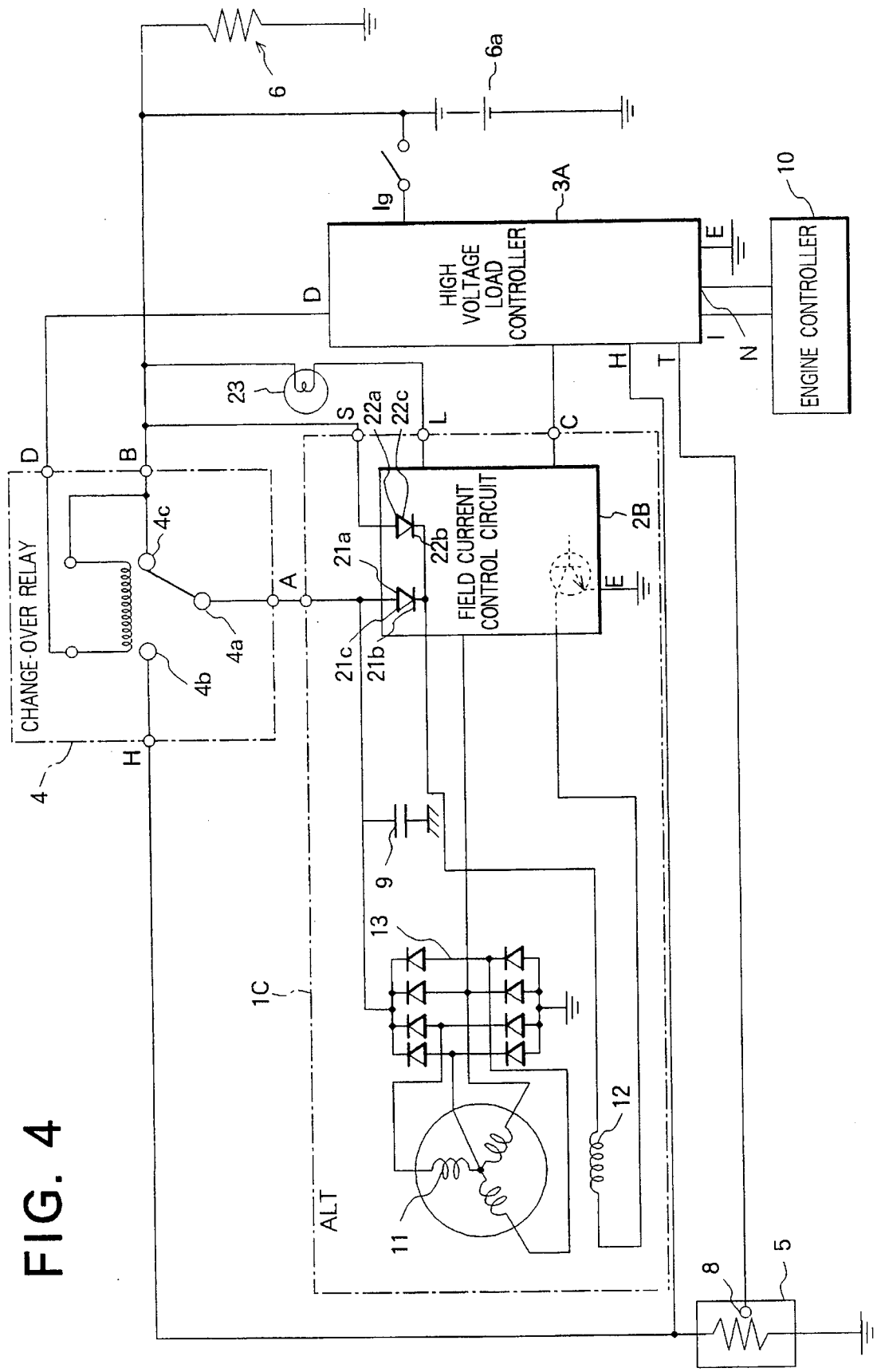
FIG. 4 is a circuit configuration illustrating a fourth embodiment of the present invention.

A fourth embodiment of the invention will be described below with reference to a drawing. FIG. 4 illustrates a configuration of a circuit of the fourth embodiment, in which parts similar to those in FIG. 1 are given the same reference numerals.

In the fourth embodiment, first and second diodes 21C and 22C are provided in a field current control circuit 22B, in which common use is made of an anode side connecting terminal of the second diode 22C and a battery sensing terminal S of a field current control circuit 2B, with the field current control circuit 2B being integrally incorporated in a generator 1C.

More specifically, as shown in FIG. 4, there are integrally provided in the field current control circuit 2B a first diode whose anode 21a is connected to the generator 1C and whose cathode 21b is connected to the input side of the field winding 12, and a second diode connected between the cathode 21b of the first diode 21C and the battery 6a forward from the battery 6a side to the field winding 12 side (cathode 21b side of the first diode 21C). In addition, the field current control circuit 2B is integrally provided in the generator 1.

According to the fourth embodiment, as in the third embodiment, existing change-over relays can be used, and incorporation and connection of the first and second diodes 21C and 22C can be carried out easily. In addition, common use can be made of the battery sensing S terminal and connection for the battery side diode which is the second diode 22C, and the number of external connections can be reduced. Further, cooling of the field current control circuit 2B, and the first and second diodes 21C and 22C can be carried out by the cooling of the generator 1C.

Fifth Embodiment

Figure 5:
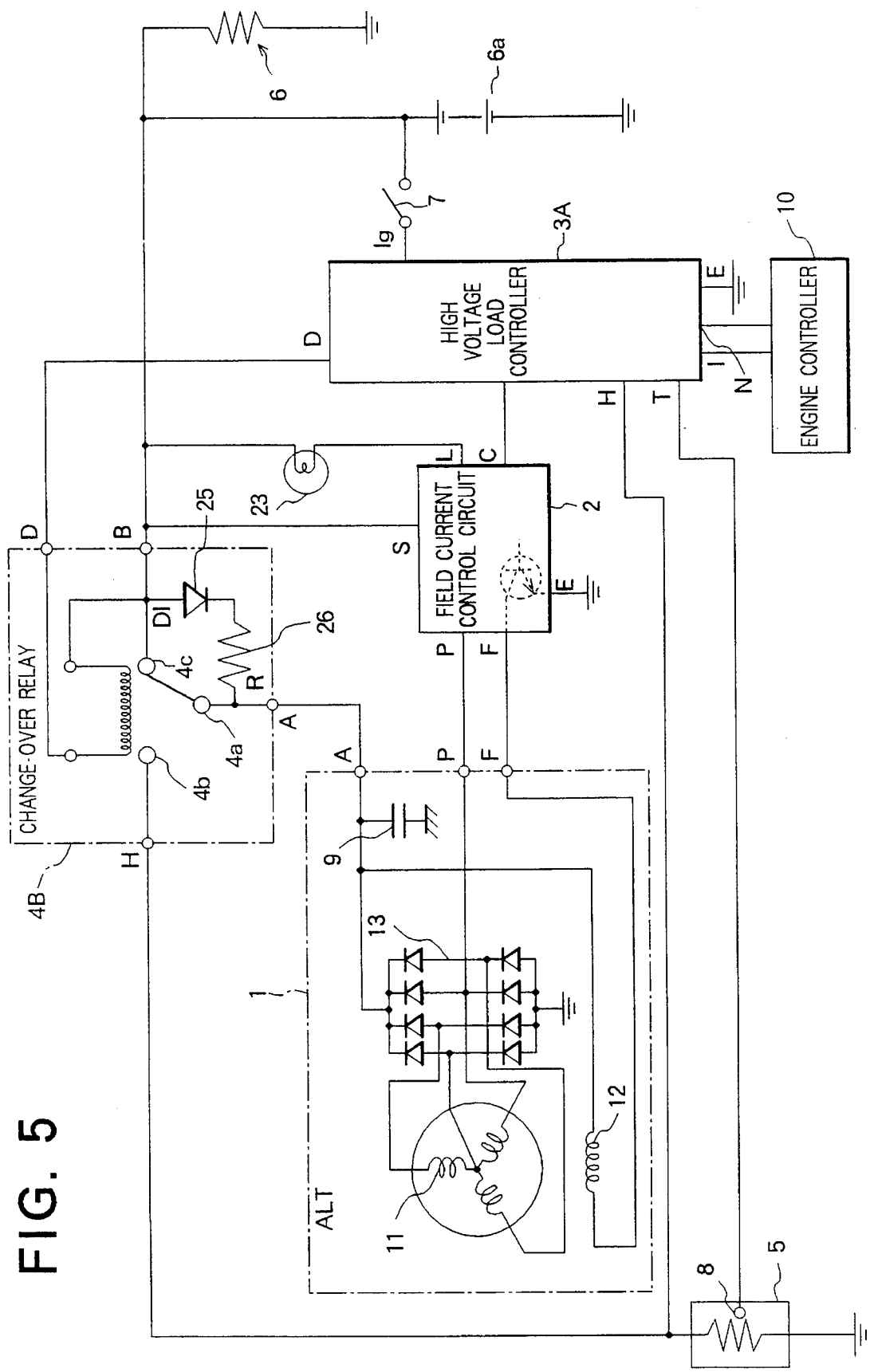
FIG. 5 is a circuit configuration illustrating a fifth embodiment of the present invention.

A fifth embodiment of the invention will be described below with reference to a drawing. FIG. 5 illustrates a configuration of a circuit of the fifth embodiment, in which parts similar to those in FIG. 1 are given the same reference numerals.

As is apparent from a comparison between FIG. 6 which illustrates a circuit configuration of the prior art and FIG. 5, in the fifth embodiment there is integrally incorporated in a change-over relay 4B a series circuit of a diode 25 and a resistance 26, which is connected between a moving contact 4a of the change-over relay 4B and a fixed contact which is the normally contacted contact at the battery side.

The output side of generator 1 and the input side of the field winding 12 are directly connected.

Next, the operation will be described. After an ignition switch 7 has first been turned on, turning on a starter switch (not shown) causes a high voltage load controller 3A to switch the change-over relay 4B at the time the engine starts to operate. This connects output terminal A of the generator 1 to terminal H of the high voltage load side. Thereafter, high voltage load controller 3A outputs to the field current control circuit 2 a total excitation or a high voltage generation mode command to change the mode from the no charge (field PTr OFF) mode to the high voltage generation mode.

At the initial stage of electric power generation by the generator 1, battery voltage causes an excitation current for the field winding to flow from the output terminal A of the generator 1 to the field winding 12 through the diode 25 and the resistance 26, and to the field current control circuit 2 through field current outflow terminal F. This causes the generator 1 to generate electric power in the high voltage generation mode.

As described above, at the initial stage of the high voltage generation mode, the field current is supplied from the battery 6a to the field winding 12 through the diode 25 and the resistance 26. However, when the output voltage of the generator 1 exceeds the voltage of the battery 6a, the field current is supplied by the output voltage of the generator 1, which causes it to be in a self-excitation state.

When this occurs, current outflow from the diode 25 to the battery 6 side is prevented. When the change-over switch 4B has been switched so that it is connected to the terminal H on the high voltage load side, the resistance 26 which is connected in series with the diode 25 prevents a large amount of current from flowing from the battery 6a to the high voltage load 5 via the series circuit (excitation circuit) containing the diode 25.

What is claimed is:

1. A power supply unit for vehicles comprising:
   a generator having stator windings and a field winding through which field current flows;
   a field current control circuit for controlling the field current;
   a change-over relay for switching the connection state of said generator between a first condition in which a high voltage load is connected to said generator and a second condition in which a vehicle system voltage load including a battery is connected to said generator;
   a high voltage load controller for controlling said change-over relay and said field current control circuit;
   a first diode having an anode connected between an output side of said generator and said change-over relay and a cathode connected to an input side of said field winding; and
   a second diode connected between said battery and the input side of said field winding to which the cathode of said first diode is connected, said second diode being directed forward from the battery side to the input side of said field winding.

2. A power supply unit for vehicles according to claim 1, wherein said first and second diodes are formed into an integral structure with said change-over relay.

3. A power supply unit for vehicles according to claim 1, wherein said first and second diodes are formed into an integral structure with said generator.

4. A power supply unit for vehicles according to claim 1, wherein said first and second diodes are provided in said field current control circuit, and common use is made of the anode side connection terminal of said second diode and a battery sensing terminal of said field current control circuit.

5. A power supply unit for vehicles according to claim 4, wherein said field current control circuit is formed into an integral structure with said generator.

6. A power supply unit for vehicles according to claim 1, wherein said field current control circuit and said high voltage load controller are combined with an engine controller for controlling the engine to form one or two units.

7. A power supply unit for vehicles comprising:
   a generator having stator windings and a field winding through which field current flows, said generator having its output side connected to an input side of said field winding;
   a field current control circuit for controlling the field current;
   a change-over relay for switching the connection state of said generator between a first condition in which a high voltage load is connected to said generator and a second condition in which a vehicle system voltage load including a battery, is connected to said generator;
   a high voltage load controller for controlling said change-over relay and said field current control circuit; and
   a series circuit including a diode and a resistor connected in series to each other between an output side of said generator and said battery with an anode of said diode being connected to said battery.

8. A power supply unit for vehicles according to claim 7, wherein said series circuit is formed into an integral structure with said change-over relay.

* * * * *